July 19, 1938.  G. A. OKERFELT  2,124,118

JIG

Filed Oct. 22, 1935  2 Sheets-Sheet 1

Inventor
George A. Okerfelt

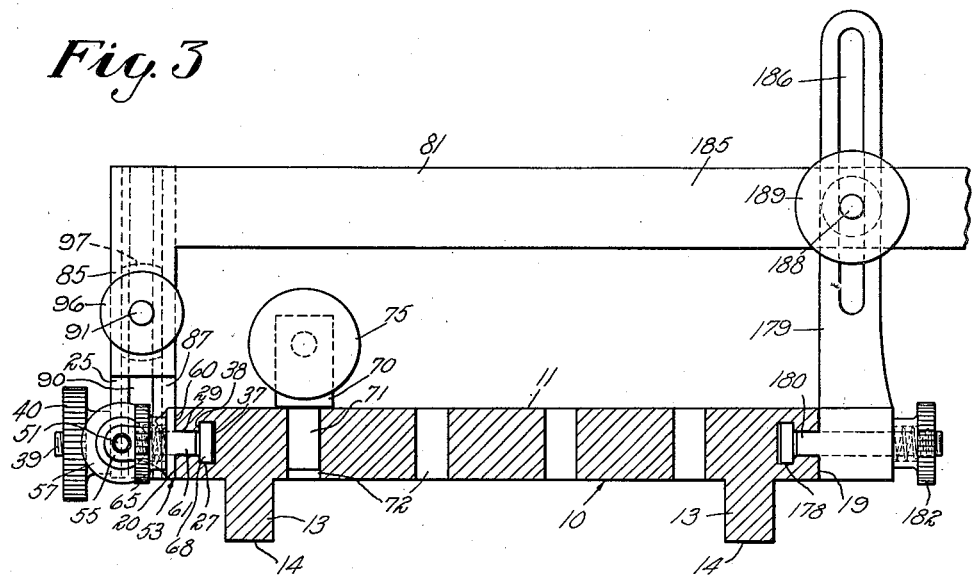
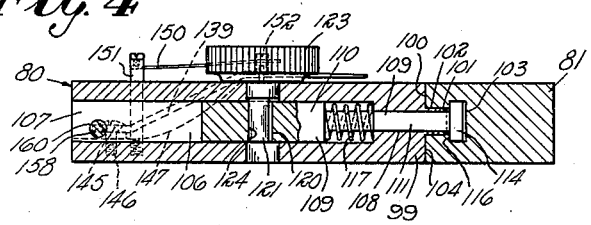
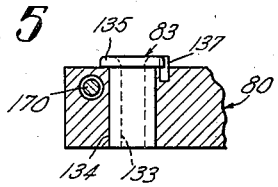

Patented July 19, 1938

2,124,118

UNITED STATES PATENT OFFICE 2,124,118

JIG

George A. Okerfelt, Hartford, Conn.

Application October 22, 1935, Serial No. 46,132

5 Claims. (Cl. 77—62)

This invention relates to drilling devices and, more particularly, to a jig especially adapted to be employed in conjunction with drilling and reaming operations in dies and similar work whereby holes of desired size may be easily and accurately produced in precisely required positions within the work piece.

It is the primary object of the present invention to provide a portable jig or drilling guide which may be utilized with any suitable drilling device to quickly and accurately locate the drilling position relative to the work so that holes of desired size may be formed therein in predetermined but adjustable positions.

It is a further object of my invention to provide a precision jig which may be simply and easily constructed and which embodies indicating mechanism whereby the axial position of a hole to be drilled in a work piece may be prelocated with extreme accuracy relative to side faces of the work.

With these and other objects in view, my invention resides in the novel construction and combination of parts hereinafter described, illustrated in the accompanying drawings, and referred to in the claims appended hereto; it being understood, of course, that the disclosures as shown in the drawings are by way of illustration only, and minor details of construction lying within the scope of the claims may be resorted to without deviating from the spirit of the invention or sacrificing any of its advantages.

To the accomplishments of these and other objects which will be apparent from the following description of my invention, I have provided a portable jig which may be utilized in conjunction with any drilling mechanism to prelocate the drilling position relative to the work so that holes may be produced therein in desired positions and with extreme accuracy.

In the drawings, wherein like parts are indicated by like numerals:

Fig. 3 is a fragmentary sectional view taken substantially along the lines 3—3 of Fig. 1;

Fig. 4 is a sectional view taken along the line 4—4 of Fig. 1; and

Fig. 5 is an enlarged sectional view taken along the line 5—5 of Fig. 1 and showing the removable drill guide.

Figure 1:
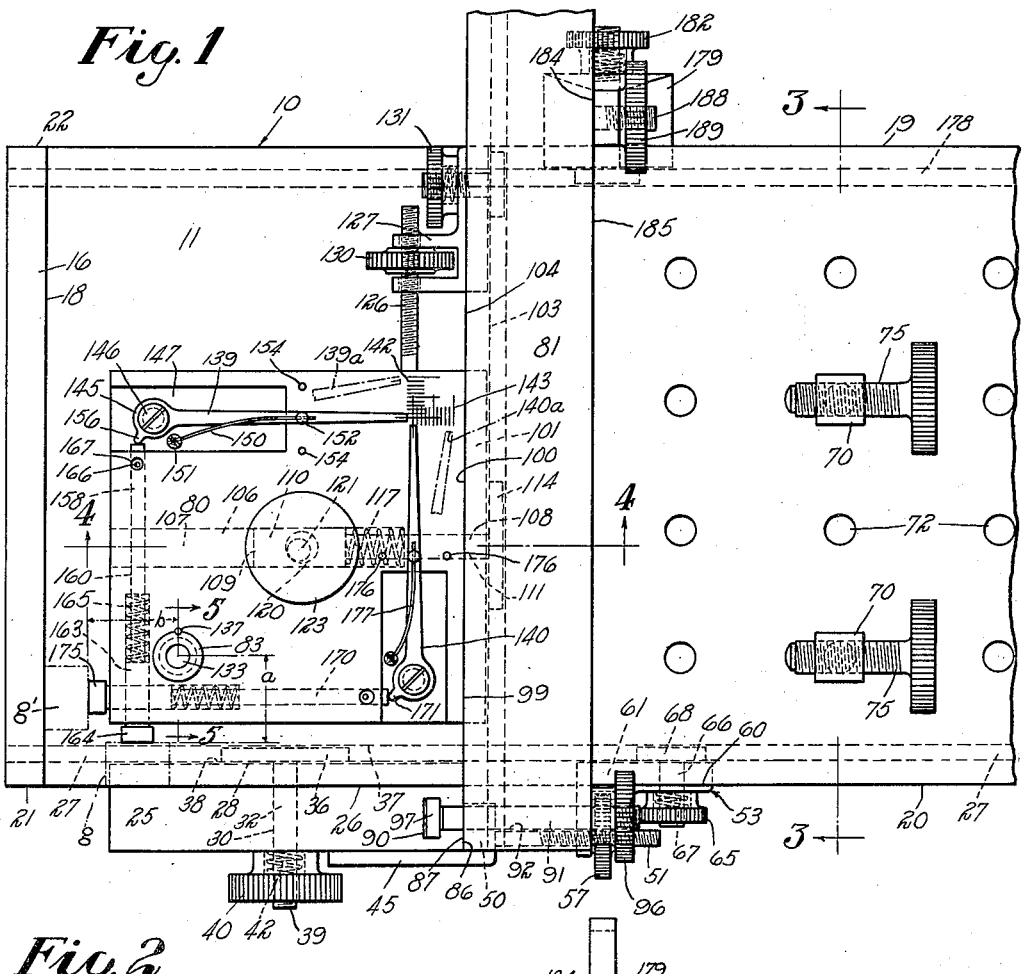
Figure 1 is a plan view of my invention showing the relative position of the various parts when adjusted to pre-locate a drilling operation.

Referring to the drawings which illustrate the preferred type of my invention, I have provided a work supporting table 10 having a plane top face 11 adapted to support a work piece in operative position and a pair of downwardly depending spaced legs 13 which preferably terminate in flat supporting faces 14 lying in the same horizontal plane whereby the table 10 may be evenly and uniformly supported on any suitable horizontal surface such as the table of a power drill. The forward end of table 10 is provided with an upstanding portion 16 which may be integrally formed therewith or, if desired, made from a separate plate suitably and rigidly secured thereto. The upstanding portion 16 is provided with a vertical surface 18, all parts of which lie in a plane lying precisely at right angles to the face 11 of table 10. The opposed sides of table 10 terminate in parallel faces 19 and 20 which lie precisely at right angles to the work supporting face 11 and also lie in the same respective planes with the end faces 21 and 22 of upstanding portion 16.

A vertical guide plate 25 is secured to face 20 of table 10 in such a manner that it may be moved towards and from the end of upstanding portion 16 and always maintain a plane guide face 26 thereon perpendicular to surfaces 11 and 18. It will thus be appreciated that a work piece, such as a die having a flat supporting face and a side and end face at right angles to each other and lying perpendicular to the supporting face, may be engaged and located by the surfaces 11, 18, and 26. To facilitate proper engagement of surface 26 with a desired portion of the work, the plate 25 is secured for slidable movement along the side face of surface 20. To accomplish this in a convenient manner and yet always maintain the surface 26 perpendicular to faces 11 and 18, I provide a T-shaped slot 27 which is cut in the side face 20 and longitudinally parallel to surface 11. The lower portion of plate 25 is provided with an inwardly projecting tongue 28 extending throughout the length of plate 25 and slidably received within the narrow portion 29 of the T-slot 27 to guide the movement of plate 25 as it is slid along surface 20.

In order to provide sufficient clearance for a clamping device to rigidly locate plate 25 in its slidably adjusted position, the tongue 28 is arranged to extend only through a portion of the width of the narrow portion of the T slot, as shown in Fig. 3. A hole 30, located intermediate of the length of plate 25, passes therethrough and through a central portion of tongue 28. A locking bolt 32 is provided with a cylindrical shank slidably received within hole 30 and having a substantially rectangular head 36 at its inner end slidably received within the enlarged portion 37 of T slot 27 and arranged to straddle the narrow portion 29 of said slot and engage the spaced inner surfaces 38 thereof. The outer end of the locking bolt is provided with a screw threaded portion 39 adapted to receive a thumb nut 40. For convenience of adjustment, the inner end of thumb nut 40 is provided with a counterbore coaxial with the screw threaded hole therethrough and arranged to receive a coiled spring 42 surrounding threaded portion 39 and resiliently engageable against member 25. It will thus be appreciated that thumb nut 40 may be tightened on locking bolt 32 to clamp head 36 against surfaces 38 and rigidly secure member 25 in desired pre-adjusted position. Whenever the thumb nut 40 is loosened, the resilient engagement of coiled spring 42 against member 25 will serve to frictionally maintain locking head 36 in positive but slidable engagement with surfaces 38 whereby plate 25 will be free to slidably move along surface 20 and yet be properly supported.

Figure 2:
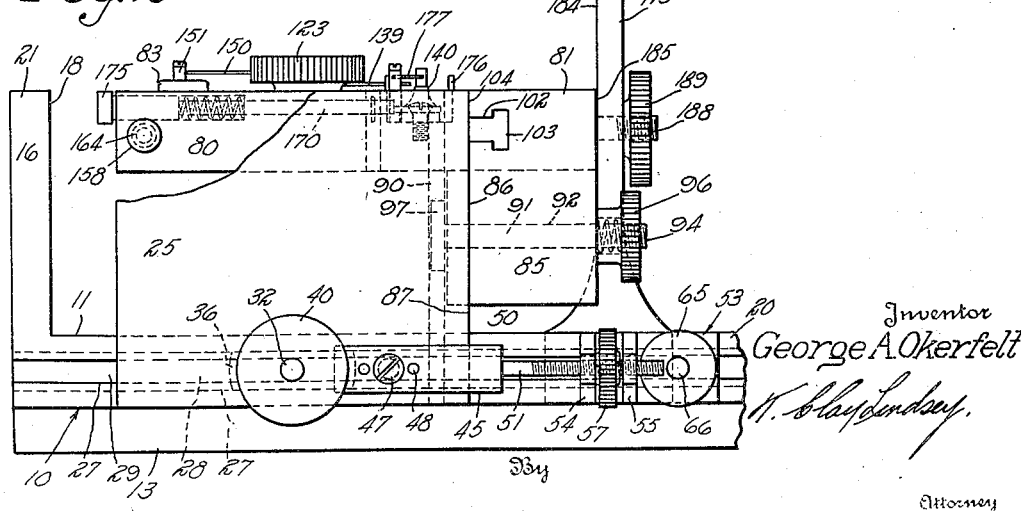
Fig. 2 is a fragmentary side elevation of my invention looking towards the bottom portion of Fig. 1.

For reason which will be later explained in detail, it is frequently desirable to minutely adjust the position of plate 25. Whereas this may be accomplished by loosening thumb nut 40 and manually sliding plate 25, for convenience of adjustment I further provide a device whereby the plate may be gradually and slowly moved through minute distances to locate it precisely where desired with relation to surface 18 of member 16. To accomplish this, I secure a bracket 45 to the lower end of member 25 adjacent to T slot 27 by means of a clamping screw 47 and pins 48 or other suitable devices. Bracket 45 is provided with an inwardly extending ear 50 having a screw threaded rod 51 rigidly secured therein and centrally aligned with slot 27 but in spaced relation thereto, as shown in Figs. 1 and 2. A clamping member, generally indicated at 53, is provided with a pair of spaced parallel outstanding ears 54 and 55 having aligned holes therethrough arranged to slidably receive threaded rod 51. A thumb nut 57 is located between said ears and screw threaded on rod 51 for a rotative progressive movement thereon. The member 53 is further provided with spaced vertically aligned surfaces 60 intermediate of which is located an inwardly projecting tongue 61 arranged for slidable movement within the narrow portion 29 of T slot 27 in the same manner as tongue 28 on plate 25. A clamping mechanism, comprising an adjustable thumb nut 65, a locking bolt 66, a spring 67, and bolt head 68 of the same general construction as described in the clamping device associated with plate 25, is suitably mounted within the rearward portion of member 53, as illustrated, whereby it may be positively locked in adjusted engagement with surface 20. It will thus be appreciated that thumb nut 65 may be loosened, and spring 67, which is arranged to bear against the body portion of member 53, will serve to frictionally maintain bolt head 68 in contact with but in slidable engagement with surfaces 38 within the T slot. Hence, when thumb nuts 40 and 65 are both loosened, the plate 25 and its associated clamping and adjusting mechanism may be manually slidably positioned along surface 20 as a unit. However, when it is desired to minutely position plate 25, thumb nut 40 is loosened and thumb nut 65 is tightened to rigidly secure the clamping member 53 in fixed position relative to the table, after which adjustment of thumb nut 57 will serve to minutely move threaded rod 51 in either desired direction and locate plate 25 as precisely required. When plate 25 has been exactly positioned, thumb nut 40 may be tightened to rigidly secure the plate in its adjusted location.

To positively and precisely locate the work in drilling position, I have provided any suitable locking device arranged to clamp the work piece in engagement with surfaces 11, 18, and 26. In the present instance, this device may comprise a plurality of bunters 70. As shown, these preferably comprise upstanding metallic posts each having a reduced cylindrical portion 71 adapted to slidably fit within any one of a plurality of holes 72 vertically extending through table 10. The upper end of each of the bunters is provided with a horizontal screw threaded hole therethrough arranged to threadably receive a thumb screw 75. The work is located against the engaging surfaces, and the bunters are then suitably positioned within desired holes 72 and employed to rigidly clamp the work against the locating surfaces. If desired, as is the usual practice in drilling operations, the work may be supported on suitable parallels, and suitable wedges may be inserted between the operative ends of the thumb screws 75 and the work.

In order to precisely locate the drilling operation relative to the work, I have provided a main drill guide plate 80 slidably located on a supporting bracket 81 which in turn is located in vertical adjustment upon the end of plate 25. A drill guide bushing 83 extends through plate 80 to locate the position of the drill during a drilling operation. Hence, it will be appreciated that by longitudinally adjusting the position of plate 25, it will serve to longitudinally position the drilling location relative to surface 18, and lateral adjustment of plate 80 on bracket 81 will serve to laterally position the drilling location relative to surface 26 of plate 25. By minutely regulating these various adjustments, the bushing 83 may be pre-located in such a manner that the work may be drilled in a precisely desired position.

The drill guide plate 80 is arranged for vertical adjustment by means of bracket 81 which is provided with a downwardly depending arm 85 having a plane vertical engaging face 86 which may be clamped into frictional engagement with the end surface 87 of member 25. This end surface is provided with a downwardly extending T slot 90 within which a locking bolt 91 is arranged for slidable movement or locking engagement therein in the same manner as disclosed in my locking bolt constructions 32 and 66. The downwardly depending arm 85, which may be an integral part of bracket 81 or a depending member rigidly secured thereto in any suitable manner, is provided with a hole 92 therethrough to slidably receive the shank of bolt 91, and said shank is provided with an outwardly extending threaded portion 94 upon which is secured a thumb screw 96. The inner end of bolt 91 is provided with an enlarged head 97 arranged to frictionally lock within T slot 90 when thumb screw 96 is tightened. A coiled spring received within a cavity of thumb nut 95 surrounds bolt 92 and resiliently engages the arm 85 of bracket 81 in the same manner as disclosed in my previously noted locking device, whereby a loosening of thumb nut 96 will maintain head 97 in slidable but supporting engagement within the T slot, and bracket 81 and guide member 80 may be vertically adjusted as a unit and thereafter locked in desired position by means of nut 96.

The drill guide plate 80 may be of any suitable shape, but, in the present instance as illustrated, it preferably comprises a substantially rectangular block having opposed parallel sides and a rearward end 99 terminating in a pair of vertically disposed end faces 100 and a protruding tongue 101 longitudinally disposed thereof and substantially central of said faces. The tongue is arranged to slidably fit within the narrow portion 102 of a T slot 103 extending longitudinally of and within the forward face 104 of bracket 81 in the same manner as previously described tongue 28 is mounted in slot 27. It will thus be appreciated that member 80 is arranged to be slidably movable relative to face 104 but in engagement therewith and with T slot 103 so that said plate will always be disposed parallel to the table face 11.

As shown in Fig. 4, I have provided a convenient type of locking device whereby the guide plate 80 may be secured in any pre-adjusted position of its lateral movement towards and from face 26 of plate 25. To accomplish this, I have provided a hole 106 extending endwise through member 80 and substantially central thereof. This hole has an enlarged forward bore 107 and a reduced rearward bore 108 which is co-axial therewith and passes through tongue 101. Received within this hole is a locking pin, generally indicated at 109, having an enlarged forwardly extending cylindrical portion 110 slidably received within bore 107 for axial movement therein and integrally secured to a reduced cylindrical portion 111 slidably received within bore 108. The cylindrical portion 111 terminates at its rearward end in a locking head 114 which is an elongated substantially flat member arranged to be clamped into frictional locking engagement with the spaced faces 116 of T slot 103. A coiled spring 117 surrounding reduced portion 111 is slidably mounted within bore 107 and under compression between the end of enlarged portion 110 and the end wall of bore 107 so that locking head 114 will normally remain in sliding frictional engagement with surfaces 116 to maintain faces 100 and 104 in engagement, thereby preventing any tendency of plate 80 to sag and lie out of parallel relation to surface 11. The enlarged portion 110 is provided with a substantially vertical hole 120 therethrough intermediate of its ends, and a shaft 121 passes therethrough and is journalled within member 80 at opposite sides of bore 107 as shown in Fig. 4. The upper end of shaft 121 is provided with a suitable knurled head 123 whereby it may be conveniently rotated, and the intermediate portion of the shaft is provided with an eccentric or cam 124 engageable with the peripheral face of hole 120 whereby rotation of shaft 121 will cause an axial movement of the entire locking pin 109 to move head 114 thereon into or out of locking engagement with surfaces 116.

In order to conveniently and minutely adjust the lateral movement of plate 80 longitudinally of T slot 103, I have provided a screw threaded rod 126 integrally secured thereto and in alignment with slot 103 but in spaced relation thereto. This rod is received within a clamping member 127 of identical construction to the member 53, and thumb nuts 130 and 131, corresponding with thumb nuts 57 and 65, may be employed to minutely and slidably position member 80 in the same manner as previously described with reference to clamping member 53. It will thus be appreciated that thumb nut 96 serves to rigidly secure the vertical location of guide plate 80, and the respective thumb nuts 40, 57, and 65 serve to aid in longitudinally positioning drill guide bushing 83 and plate 80 relative to surface 18; and members 123, 130, and 131 serve to aid in laterally positioning bushing 83 relative to guide face 26.

My drill guide bushing 83 preferably comprises a wear resistant sleeve member composed of suitable material such as a hardened steel bushing having an internal bore 133 of such size as to slidably receive a drill of desired size and an outer peripheral cylindrical surface 134 slidably received within a vertical bore passing through plate 80. The upper end of bushing 83 terminates in an enlarged annular or flanged portion 135 arranged to seat against member 80 and having a cut away portion in its periphery adapted to slidably engage a locating pin 137 which prevents rotation of the drill guide relative to plate 80. The upper end of bore 133 is preferably flared, as shown, to aid in guiding the drill into said bore. In the present instance, only a single removable drill guide sleeve has been illustrated, but it will be appreciated that this invention contemplates various sizes of drill guide sleeves arranged to interchangeably fit within bore 134 and seat against plate 80, as shown.

The present invention further contemplates an indicator mechanism whereby the plate 80 may be minutely adjusted by means of adjustment nuts 57 and 130 to precisely axially position the drill guide bushing 83 at an accurate and predetermined location. To accomplish this, I have provided a pair of amplifying pointers 139 and 140 arranged to move over the respective intersecting scales 142 and 143 and magnify and indicate each minute movement of plate 80 while it is being moved into final adjusted position.

Pointer 139, as illustrated in Fig. 4, is provided with a downwardly projecting rearward portion terminating in a head 145 journalled for free pivotal movement on a stud 146 secured within a cavity 147 in the top of plate 80. A spring 150, secured at one end to a vertical stud 151 fastened within said cavity and at the other end to a stud 152 mounted upon pointer 139 intermediate of its ends, tends to normally swing the pointer to the indicated dot and dash position 139a. The extreme pivotal movement of said pointer is limited by two studs 154. Head 145 has a short outwardly projecting arm 156 which is engageable with the end of a rod 158 slidably mounted within a bore 160 extending laterally through member 80 and having an axis which is parallel both to surfaces 11 and 18. This bore is provided with an enlarged portion adapted to slidably receive an enlarged cylindrical portion 163 at the outer end of rod 158 and terminating in a head 164 having a flat outer end face.

A coiled spring 165 surrounding the reduced portion of rod 158 is slidably mounted within the enlarged bore and maintained under longitudinal compression between the inner end of member 163 and the inner end of said enlarged bore thereby tending to normally maintain rod 158 retracted from cavity 147 and at the outer end of its axial movement towards surface 26. The axial movement of rod 158 is limited by means of a substantially vertical pin 166 laterally extending therefrom and arranged for movement therewith diametrically across a vertical hole 167 within member 80. This vertical hole is preferably of such diameter as to provide sufficient lateral movement of pin 166 and correspondingly longitudinal movement of rod 158 to allow for angular movement of pointer 139 across the entire extent of graduations on scale 142.

In view of the fact that spring 150 normally tends to swing pointer 139 to the position indicated at 139a, it will be appreciated that short arm 156 will always be maintained in operative engagement with the end of rod 158, and the pointer will normally rest at the lower end of graduations 142 except when head 164 is engaged and depressed to cause axial movement of rod 158 and a corresponding pivotal magnifying movement of pointer 139. Pointer 139 is provided with an index line at its outer end arranged to align with and indicate on graduations 142 the extent of longitudinal movement of head 164. Whenever this pointer is in alignment with a zero index line as indicated in Fig. 1, the perpendicular distance from the outer end of head 164 to the axis of guide bushing 83 will always be the same known distance. This distance is indicated in the drawings by letter a.

Whenever it is desired to laterally position plate 80 so that the axis of the drill guide will lie at an exactly required distance from surface 26, it is simply necessary to insert one or more precision gauge blocks of desired thickness and herein indicated in dot and dash lines by letter g between the end of head 164 and surface 26. Plate 80 is then moved towards the gauge block until head 164 of rod 158 engages the gauge block and pointer 139 starts to move. Thumb nut 131 is thereafter tightened to rigidly lock member 127 against bracket 81, and thumb nut 130 is turned to further adjust and minutely position plate 80 to bring pointer 139 to its desired index position as shown in Fig. 1. Head 123 is thereafter turned to positively lock plate 80 in its pre-adjusted position. At this time, the perpendicular distance between the axis of the drill guide and surface 26 will be precisely the known distance a plus the known thickness of guide block g, and in view of the magnifying properties of the pointer, the probability of error will be extremely remote. Hence, to precisely position the drill guide, it is simply necessary to employ one or more precision guide blocks of a required thickness.

The pointer 140 is actuated in an identical manner as pointer 139 wherein a rod 170 is slidably mounted for longitudinal movement within member 80 parallel to surfaces 11 and 26 and arranged to engage the short end 171 of lever 140 to move it across scale 143. The outer end of rod 170 is provided with a suitable head 175 corresponding to head 164 and arranged to be engaged with a suitable precision gauge block g' in the same manner as heretofore described with reference to head 164. Pointer 140 is limited in its movement by pins 176 and normally urged towards the right by a spring 177 to position 140a in the same manner as described for pointer 139. It is not believed that it is necessary to go into further detail regarding the control of pointer 140 since the construction is identical to that employed for movement of pointer 139. It will be appreciated that the perpendicular distance between the end of head 175 and the axis of sleeve 83 is always the same known distance whenever the pointer 140 rests on the zero index line as shown in Fig. 1. This distance is illustrated by b. It will thus be appreciated that by employing one or more precision gauge blocks g' of required thickness, the axial distance between the axis of the hole to be drilled and the surface 18 may be quickly and easily predetermined by slidably positioning plate 25 in the manner previously described and locking said plate in final position with pointer 140 aligned with the zero index line in the position shown in Fig. 1. It will further be appreciated that the graduations of my scales may be so spaced as to each indicate a known distance and thus aid in precisely locating the plate 80 and bushing 83 in the precisely required position.

In view of the fact that the bracket 81 may tend to spring slightly and cause the drill guide to become inaccurately positioned, I have further provided a T slot 178 within edge 19 of table 10, and an upstanding bracket 179, having a laterally protruding tongue 180 slidably positioned within said slot, may be rigidly secured in adjusted position by means of a locking device of the same type as employed for securing my member 25 within the slot 27 and adjustably locked in position by means of a thumb screw 182. Bracket 179 is further provided with a vertical upstanding face 184 adapted to be clamped flat against the rear face 185 of bracket 81. Bracket 179 is provided with an elongated vertical slot 186 arranged to slidably receive a stud 188 which is integrally secured to and projects horizontally and rearwardly from face 185 of bracket 81. The portion of said stud projecting through the slot is engaged by thumb nut 189 which may be tightened against the rear face of bracket 179 to rigidly support bracket 81. It will thus be appreciated that during the adjustment of guide plate 80 to its precisely required location, thumb screw 189 is removed. When the plate is adjusted to its predetermined position, thumb screw 182 is loosened and bracket 179 is slid within slot 178 until face 184 is in abutting engagement with face 185 after which thumb nut 182 is tightened and nut 189 is mounted and tightened upon screw 188 to aid in the rigid support of the overhanging end of bracket 81.

I claim as my invention:

1. A portable jig for locating a drilling operation comprising a table having a flat work supporting face and an end wall provided with a work locating face disposed at right angles to the supporting face, a work guide member, means slidably securing said guide to a side of the table in perpendicular relation to the work guide and for movement towards and from said end wall, mechanism to minutely adjust the position of the work guide towards and from the end wall, a locking device to secure the guide in adjusted position, a bracket slidably mounted on the guide for adjustable vertical movement and overlying the table, means adjustably securing the bracket on the guide, a drill guide plate slidably mounted on the bracket in parallel overlying relation to the table for adjustable movement towards and from the work guide, means to minutely adjust the drill guide plate, and a locking device to secure said plate in its adjusted position.

2. A portable jig for locating a drilling operation comprising a table having a flat work supporting face, an end wall on the table having a work locating face perpendicularly disposed to the supporting face, a work guide member having a work engaging face perpendicularly disposed to said other faces, means slidably securing the guide to a side of the table for movement towards and from the end wall with the work engaging face in perpendicular relation to said other faces, mechanism to adjustably position the work guide, locking means to secure the guide in its adjusted position, a bracket adjustably and vertically movable on said guide in overlying relation to the table, means securing the bracket in adjusted position, a supporting member adjustably secured to the table and to said bracket to cooperate with the work guide member in supporting the bracket relative to the table, a drill guide plate slidably mounted on the bracket in parallel relation to the table for movement towards and from the work guide, and means to adjustably position the drill guide plate relative to the work guide member.

3. In a portable jig, the combination of a work support, an end wall on said support, a work engaging member slidably mounted on the support for movement towards and from said end wall, work locating faces on the end wall and the work engaging member respectively perpendicularly disposed to each other, mechanism to lock the work engaging member in adjusted position, a drill guide plate located above the work support and carried by the work engaging member for adjustable movement therewith towards and from the end wall, means to adjustably position the drill guide plate towards and from the work engaging member, and an indicator mounted on the drill guide plate, the indicator having an amplifying pointer mounted for swinging movement, a graduated scale on the guide plate cooperating with the pointer, a rod slidably mounted in the drill guide plate, one end of said rod being operatively associated with the pointer and the other end of said rod being operatively associated with one of said work locating faces whereby the indicator will be moved over the scale to accurately measure the position of the drill guide plate relative to said face.

4. In a portable jig for locating a drilling operation in a work piece, a work supporting table, work locating members on the table, a drill guide plate supported above the table by one of said members and arranged for adjustable movement towards and from said members, a drill guide in said plate, means to lock the plate in adjusted position, an amplifying indicator mechanism mounted on the drill guide plate to register when the drill guide is located in a predetermined position relative to the locating members, the indicator mechanism including a pointer journalled for pivotal movement on the plate and having a long arm and a short arm, a graduated scale on the plate cooperating with said long arm, a rod slidably mounted in the plate and operatively engaging the short arm, a spring pivotally urging the pointer into engagement with said rod, means limiting the extent of movement of the rod, and the outer end of the rod being operatively associated with one of said work locating members whereby the pointer will accurately indicate on the scale when the drill guide is located in a predetermined position relative to said locating member.

5. In a portable jig, the combination of a work support having an end wall, a work engaging member slidably mounted on the support for movement towards and from the end wall, mechanism to lock the work engaging member in adjusted position, a drill guide plate located above the work support and carried by the work engaging member for adjustable movement therewith, means to adjustably position the drill guide plate toward and from the work engaging member, a drill guide bushing in said plate, an indicating device mounted on the plate and arranged to indicate when the axis of the guide bushing is precisely located relative to the end wall, a similar indicating device arranged to indicate when the axis of the bushing is precisely positioned relative to the work engaging member, each of said devices having a pointer pivotally mounted on the plate and provided with a long arm and a short arm, a graduated scale on the plate cooperating with each long arm, rods mounted in the plate for slidable movement and respectively engageable with said short arms, resilient means tending to urge the rods out of the plate, means limiting the extent of rod movement, springs maintaining the pointers in operative engagement with said rods, and the outer ends of the rods being respectively operatively associated with the work locating faces in response to the final adjustable movement of the plate whereby minute adjustments of the plate are magnified and the drilling position may be pre-located with extreme accuracy.

GEORGE A. OKERFELT.